No. 717,264. Patented Dec. 30, 1902.
H. R. PALMER.
PNEUMATIC TIRE.
(Application filed Oct. 11, 1902.)
(No Model.)
Fig. 1.
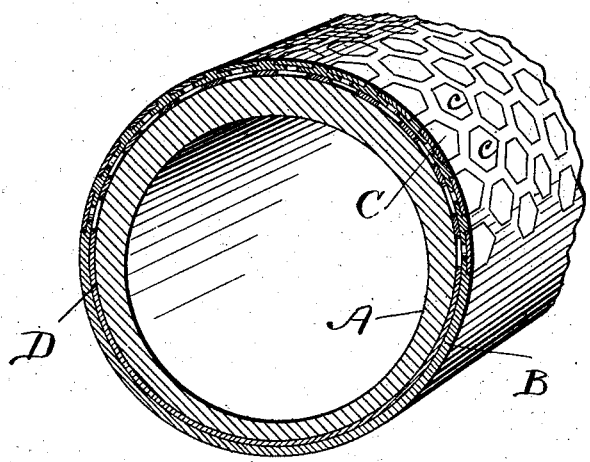
Fig. 2.
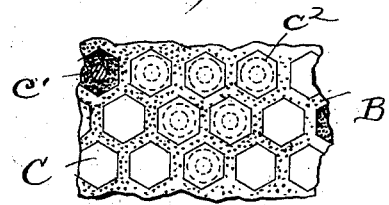
Fig. 3.
Witnesses.
E. B. Gilchrist
H. M. Wise
Inventor.
Hubert R. Palmer
By his attorneys
Thurston & Bates

UNITED STATES PATENT OFFICE.

HERBERT R. PALMER, OF CLEVELAND, OHIO, ASSIGNOR OF ONE-HALF TO OMAR STOPPEL, OF CLEVELAND, OHIO.

PNEUMATIC TIRE.

SPECIFICATION forming part of Letters Patent No. 717,264, dated December 30, 1902.

Application filed October 11, 1902. Serial No. 126,862. (No model.)

*To all whom it may concern:*

Be it known that I, HERBERT R. PALMER, a citizen of the United States, residing at Cleveland, in the county of Cuyahoga and State of Ohio, have invented a certain new and useful Improvement in Pneumatic Tires, of which the following is a full, clear, and exact description, reference being had to the accompanying drawings.

The object of this invention is to provide a pneumatic tire which shall have a metal protection on its tread, greatly reducing the wear and liability to puncture. I accomplish this object by making the tire of two parts—an inner member and an outer sheath—and riveting numerous rivets through the outer sheath, with their heads on the outer side embedded in the rubber and flush therewith, the rivets being staggered to prevent any long exposed line, but not overlapping, so as not to interfere with the flexibility of the tire. I then vulcanize this outer sheath to the inner tube.

My invention includes such a tire, broadly, as stated, and the more specific embodiment thereof hereinafter described, wherein the inner ends of the rivets are protected from the outward pressure of the inner air-filled tire by being substantially embedded in the outer covering of the inner tube.

In the drawings, Figure 1 is a perspective view of a section of my pneumatic tire. Fig. 2 is a plan of a portion thereof, and Fig. 3 is an enlarged cross-section of a portion of the tire.

Referring to the parts by letters, A represents that portion of the tire which was originally the inner tube, and B the portion which was an outer sheath. This latter member in its original form was slitted along its inner periphery.

C represents the rivets. These are placed with their heads $c$ on the outer side of the tire, their shanks $c'$ going through the sheath portion B and receiving washers $c^2$ on the inner side of such portion, the ends of the shanks being upset beyond the washers. After the rivets are in place the parts are assembled, as shown, and vulcanized together.

I have found in some cases if the inner ends of the rivets are not protected from the outward pressure of the air-filled inner tube that the pressure will force the rivets to protrude from the tire. To prevent this action, the inner face of the outer sheath before it is vulcanized may be countersunk around the rivets deeply enough to contain said inner ends and their washers, or a separate unvulcanized strip D, which is thicker than the inner projecting ends of the rivets, may be perforated, so as to embrace said inner ends, and when this strip is placed between the outer sheath and inner tube said ends will be protected from the outward pressure of the inner tube. When this separate strip is used and placed, as stated, all the parts are vulcanized together.

Both constructions result practically in embedding the inner ends of the rivets in the outer covering of the inner air-tube, and either construction may be adopted, as, indeed, may any other specific construction in which the inner ends are so substantially embedded.

The rivets do not overlap or touch each other, and thus they do not interfere with the flexibility of the tire. They are staggered and placed close enough together so that there is no long line of exposed tire between them. In automobile use, for which purpose this tire is particularly designed, the tread of the tire, as is customary, is made thick enough so that small objects, as tacks, &c., would not puncture it. It is only when the tire runs onto a hoop or something of that sort and receives a long gash that the tire is punctured, and my rivets effectually prevent this. The outer surface of the rivets are flush with the surface of the tire, and therefore there are no projecting edges adapted to be caught and cause the tire to tear. At the same time the wear comes almost entirely on the metal rivets, for the yielding rubber gives back under the outside pressure at the tread. The rivets preferably have their heads made hexagonal, as shown, as this allows of their more effectively covering the surface.

Having described my invention, I claim—

1. A pneumatic tire comprising an inner tube and an outer sheath vulcanized together, numerous rivets in the sheath having their heads substantially flush with the outer surface thereof, having their shanks extending through the sheath, washers on the shanks on the inner side of the sheath, the rivets being upset beyond the washers, substantially as described.

2. In a pneumatic tire, the combination of an inner member and an outer member vulcanized together, and numerous rivets riveted to the outer member, said rivets being in staggered position and having hexagonal heads which do not overlap, substantially as described.

3. A pneumatic tire comprising an inner tube and an outer sheath vulcanized together, and numerous rivets passing through said sheath and having their inner ends substantially embedded in said sheath, substantially as specified.

4. A pneumatic tire comprising an inner tube and an outer sheath vulcanized together, and numerous rivets passing through said sheath and having their heads flush with the outer surface of said sheath, and having their inner ends substantially embedded in said sheath, substantially as described.

5. A pneumatic tire comprising an inner tube, an outer sheath, and an intermediate perforated strip all vulcanized together, and numerous rivets passing through the outer sheath and having their inner ends projecting into the perforations of said strip, substantially as described.

In testimony whereof I hereunto affix my signature in the presence of two witnesses.

HERBERT R. PALMER.

Witnesses:
ALBERT H. BATES,
H. M. WISE.